US008548197B2

(12) United States Patent
Polle

(10) Patent No.: US 8,548,197 B2
(45) Date of Patent: Oct. 1, 2013

(54) METHOD FOR ESTIMATING THE MOTION OF A CARRIER RELATIVE TO AN ENVIRONMENT AND COMPUTING DEVICE FOR NAVIGATION SYSTEM

(75) Inventor: Bernard Polle, Saint Orens (FR)

(73) Assignee: Astrium SAS, Paris (FR)

( * ) Notice: Subject to any disclaimer, the term of this patent is extended or adjusted under 35 U.S.C. 154(b) by 279 days.

(21) Appl. No.: 13/231,009

(22) Filed: Sep. 13, 2011

(65) Prior Publication Data

US 2012/0070037 A1 Mar. 22, 2012

(30) Foreign Application Priority Data

Sep. 14, 2010 (FR) .................................... 10 03651

(51) Int. Cl.
*G06K 9/00* (2006.01)

(52) U.S. Cl.
USPC ......................................................... 382/103

(58) Field of Classification Search
None
See application file for complete search history.

(56) References Cited

U.S. PATENT DOCUMENTS

| 7,352,386 | B1* | 4/2008 | Shum et al. ..................... 348/42 |
| 2003/0012410 | A1 | 1/2003 | Navab et al. |
| 2003/0021445 | A1* | 1/2003 | Larice et al. .................. 382/104 |
| 2006/0078162 | A1 | 4/2006 | Wonneberger |
| 2009/0214077 | A1* | 8/2009 | Wuerz-Wessel et al. ..... 382/103 |

OTHER PUBLICATIONS

French Search Report dated Apr. 20, 2011, corresponding to the Priority Application No. 10 03651.
"Hu Zhencheng, et al.; Real-time data fusion on tracking camera pose for direct visual guidance"; Intelligent Vehicles Symposium, 2004 IEE PARMA, Italy Jun. 14, 2004; pp. 842-847; XP010727757.
P.Honkamkaa, et al.; "Interactive outdoor mobile augmentation using markerless tracking and GPS"; Proceedings Virtual Reality International Confernece (VRIC); Laval, France; Apr. 18, 2007; XP002588869.
Q-Luong; "Self-Calibration of Moving Camera from Point Correspondences and Fundamental Matrices"; International Journal of Computer Vision; vol. 22, No. 3; 1997; pp. 261-289; XP002633656.
Dias J. Mirisola L.G.B.; Tracking from a Moving Camera with Attitide Estimates; 2008; XP002633658.

* cited by examiner

*Primary Examiner* — Claire X Wang
(74) *Attorney, Agent, or Firm* — Young & Thompson

(57) ABSTRACT

A method (10) for estimating a carrier's movement relative to an environment (20) with respect to which the carrier moves, the carrier having at least one navigation sensor and one vision sensor producing 2D images of the environment installed, The method (10) includes the following steps: i) (12) identifying, in images acquired by the vision sensor, characteristic elements of the images representing characteristic elements of the environment, ii) (14) calculating, based on characteristic elements of a triplet of images acquired at different times, at least one condensed measurement representative of characteristics of the carrier's movement during the acquisition of the triplet's images, iii) (16) estimating the movement by a navigation filter, based on navigation measurements made by the navigation sensor and on the at least one condensed measurement. A computing device for a navigation system of a carrier is also described.

15 Claims, 2 Drawing Sheets

METHOD FOR ESTIMATING THE MOTION OF A CARRIER RELATIVE TO AN ENVIRONMENT AND COMPUTING DEVICE FOR NAVIGATION SYSTEM

FIELD OF THE INVENTION

The present invention relates to the field of navigating carriers such as vehicles, robots, etc. More specifically, this invention relates to estimating the movement of a carrier relative to an environment with respect to which this carrier is moving.

BACKGROUND

The environment is, for example, the surface of a celestial body, another vehicle, a structured relief (city, building), etc.

The carrier must be able to move independently relative to this environment without previous knowledge of it, or with limited previous knowledge. To that purpose, it is necessary to determine its movement relative to this environment.

The carrier's movement is determined using a navigation system comprising one or more navigation sensors installed on board said carrier. The navigation system determines the movement by suitable processing of measurements provided by the navigation sensors. The navigation sensors may be of different types, e.g. GPS receiver, accelerometer, odometer, gyroscope, etc.

The carrier's movement relative to the environment is estimated by utilizing a navigation filter that combines a displacement model (e.g. the equations of the carrier's kinematics) with the navigation measurements provided by the navigation sensors.

However, there are many scenarios in which the navigation system fails to estimate correctly carrier's movement relative to the environment by itself.

This is the case, for example, for a wheeled carrier operating on the surface of a terrain and equipped with an odometer measuring wheel rotation. The odometric measurements are not sufficient to reconstruct the carrier's movement when it slips or slides on the terrain.

It is also the case for a carrier moving relative to a celestial body and having an inertial navigation unit providing measurements of angular speeds and linear accelerations according to at least three independent axes. A navigation filter processes these measurements at high frequency (typically 150 Hz) using a local gravity field model, for example through an extended Kalman filter, in order to reconstruct the carrier's position and speed relative to the celestial body. The inevitable drift of the inertial navigation sensors and the initial error on the carrier's position relative to the environment are sources of errors in the estimate of said carrier's movement, in particular in the estimate of its position relative the environment. These errors accumulate and propagate over time in the subsequent estimates.

This is also the case for a carrier equipped with a GPS receiver. While such a GPS receiver is generally designed to provide an accurate estimate of the carrier's position (typically within one meter in some cases), this accuracy is degraded if the GPS measurements are lost or corrupted. Such a loss or corruption of the GPS measurements can occur in particular because of obstacles on a radio channel between the carrier and the GPS transmitter and/or because of multipath phenomena on said radio channel.

In order to resolve these limitations, it is known to implement a vision system and to equip the carrier with one or more vision sensors that acquire two-dimensional images (2D) of the environment.

Information from the vision system is processed by the navigation system. For that purpose, the navigation filter is augmented to take the measurements provided by the vision system into account.

Many digital implementations of the augmented navigation filter can be developed, for example, Kalman filter, extended Kalman filter, information filter, particle filter, Bayesian filter, etc.

Examples of such augmented navigation systems are, for example, described in the context of space vehicle type carriers in the following scientific publications:

"Navigation for Planetary Approach and Landing", B. Frapard et al, 5th International ESA Conference on Guidance Navigation and Control Systems, 22-25 Oct. 2002, Frascati, Italy;

"Autonomous Navigation Concepts for Interplanetary Missions", B. Polle et al, IFAC Symposium on Automatic Control in Aerospace 14-18 Jun. 2004, Saint Petersburg, Russia;

"Mars Sample Return: Optimising the Descent and Soft Landing for an Autonomous Martian Lander", X. Sembély et al, Symposium on Atmospheric Reentry Vehicles and Systems, 23 Mar. 2005, Arcachon, France;

"Vision Navigation for European Landers and the NPAL Project", G. Bodineau et al, IFAC Symposium on Automatic Control in Aerospace, 25-29 Jun. 2007, Toulouse, France.

In these scientific publications, an inertial navigation system is considered based on navigation measurements including measurements of the vehicle's linear accelerations along the three axes of a reference frame associated to the vehicle, and measurements of the vehicle's angular speed along these three axes. The inertial navigation filter's state vector comprises states relative to the movement, such as the vehicle's position, speed and attitude angles in a reference frame associated to the environment. The navigation filter propagates (prediction step) an estimate of the state vector taking into account a local gravity field model, and the estimation errors' covariance for these states. The navigation filter recalibrates (update step) the estimate of the state vector, and consequently of the vehicle's movement, from the navigation measurements.

In these scientific publications, the inertial navigation system is combined with a vision system comprising a camera installed in the vehicle, providing 2D images of the environment at a typical frequency of 10 to 100 Hz.

Characteristic areas of the environment are identified in an image. A characteristic area of the environment is an area whose representation in the image, as a set of pixels, has the property of being able to be recognized from one image to the next, for example by image correlation or pattern recognition. For instance, a characteristic area of the image may be a set of several pixels to several tens of pixels, in which there are variations in luminance or texture or contrast in at least two directions.

The characteristic areas of the environment are tracked from one image to the next by image correlation. A point on the image, called the "characteristic point of the image" $M_i$, is associated with each characteristic area. The characteristic point $M_i$ is, for example, the radiometric or geometric barycenter of the pixel mask representing this characteristic area, or a specific point of this characteristic area. The displacement of characteristic points $M_i$ from one image to the next is representative of the vehicle's translational and rotational movement relative to the environment.

The vehicle's movement in position and attitude is estimated by augmenting the inertial navigation filter's state vector with the coordinates, in a reference frame, of the characteristic points $M'_i$ of the environment represented by the characteristic points $M_i$ of the image. A reference frame associated to the carrier is designated by (O,X,Y,Z), and is for example defined by considering 0 to be the center of the camera's focal plane, Z the camera's optical axis, and (X,Y) the camera's focal plane.

The navigation filter's state vector is estimated using 2M measurements corresponding to the directions of the vectors $OM'_i$ in the reference frame, in addition to the inertial navigation system's measurements.

The states and measurements of the navigation filter having thus been augmented, the navigation filter's state vector is estimated based on a model of the temporal evolution of the system's states and a model of the various measurements.

However, the main drawback of navigation systems that also use measurements from images lies in the fact that estimating the carrier's state using a navigation filter thus augmented with states and measurements linked to the characteristic points $M'_i$ requires significant computation power.

Further, such navigation systems are very sensitive to the quality of the characteristic areas of the environment. In particular, the characteristic areas must be fixed elements of the environment; mistakenly considering a moving element of the environment to be a characteristic area is very detrimental to the accuracy of the estimate of the vehicle's movement.

SUMMARY OF THE INVENTION

The objective of this invention is to propose a method for estimating a carrier's movement that allows measurements obtained from images of the environment to be used while limiting the impact in terms of processing complexity.

Another objective of this invention is to propose such a method, which makes it possible, in some modes of implementation, to improve the robustness of the estimate with regard to the characteristic areas of the environment identified in the images.

According to a first aspect, this invention relates to a method for estimating a carrier's movement relative to an environment with respect to which said carrier is moving, the carrier having at least one navigation sensor and at least one vision sensor producing 2D images of the environment installed. The method comprises the following steps: i) identifying, in images acquired by the vision sensor, characteristic elements of the images representing characteristic elements of the environment, ii) calculating, based on characteristic elements of the images tracked from one image to the next within a triplet of images acquired at different times, at least one condensed measurement representative of characteristics of the carrier's movement during the acquisition of said triplet's images and iii) estimating the movement by a navigation filter, based on navigation measurements made by the navigation sensor and on the at least one condensed measurement.

According to particular modes of implementation, the estimation method comprises one or more of the following characteristics, considered alone or in any technically possible combination.

Preferably, during the calculation step, a condensed measurement is determined that is representative of a ratio of the distances traveled by the carrier between the acquisition times of two image pairs of said triplet, based on characteristic elements of the triplet's images representing characteristic elements of the environment visible on each of said triplet's three images.

Preferably, during the calculation step, at least one condensed measurement is determined that is representative of a direction of the carrier's displacement between the acquisition times of an image pair of the triplet, based on characteristic elements of this image pair representing characteristic elements of the environment visible on each of this pair's two images.

Preferably, during the calculation step, at least one condensed measurement is determined that is representative of a normalized relative pose between the acquisition times of an image pair of the triplet, based on characteristic elements of this image pair representing characteristic elements of the environment visible on each of this pair's two images.

Preferably, the characteristic elements are characteristic points and/or characteristic objects or one or more characteristic surfaces.

Preferably, the triplet's images are images selected from a plurality of images acquired by the vision sensor.

Preferably, at least one of the triplet's images is an image for which a carrier's displacement detection criterion is verified.

Preferably, the carrier's displacement detection criterion is verified for a second image when, with a first image selected and with a plurality of characteristic elements of the environment, N in number, visible in said first image:
  at least Nb of the N characteristic elements of the environment have disappeared in said second image, or
  at least Nb new characteristic elements of the environment have appeared in said second image,
Nb being substantially equal to $r_P \cdot N$, where $r_P$ is a predefined percentage.

Preferably, the predefined percentage $r_P$ is equal to or greater than 20%, preferably substantially equal to 25%.

Preferably, the method comprises a step of searching for aberrant characteristic elements amongst the plurality of characteristic elements of the images; characteristic elements regarded as aberrant are not considered in the calculation step.

Preferably, the step searching for aberrant characteristic elements of the images comprises the following sub-steps:
  establishing groups of characteristic elements representative of at least five characteristic elements of the environment visible in each image of a pair and/or triplet to be used to calculate a condensed measurement,
  calculating, for each group of characteristic elements of the images, an estimate of the condensed measurement to be calculated,
  searching for groups of aberrant characteristic elements for which the estimate of said condensed measurement to be calculated is aberrant with respect to all the estimates of said condensed measurement to be calculated.

Preferably, the navigation filter's state vector comprises the carrier's state at the acquisition times of the triplet's images.

Preferably, a condensed measurement representative of a normalized relative pose between the acquisition times of at least one pair of the triplet is supplied to the navigation filter substantially at the time the second image of said pair (i.e. the most recent image) is acquired.

Preferably, in the calculation step, the error in estimating the at least one condensed measurement is estimated and, in the estimation step, the carrier's movement is estimated based on the estimate of the error made in estimating the at least one condensed measure.

According to a second aspect of the invention, this invention relates to a computing device for a navigation system of a carrier having at least one navigation sensor and at least one vision sensor installed. The computing device comprises means configured to estimate the carrier's movement according to any one of the modes of implementation of the estimation method of the invention.

BRIEF DESCRIPTION OF THE DRAWINGS

The invention will be better understood on reading the following description, given as a non-limiting example and made with reference to the figures which represent:

FIG. 4b: a diagram showing in greater detail a preferred mode of implementation of a particular step of the estimation method of FIG. 4a.

DETAILED DESCRIPTION

Figure 1:
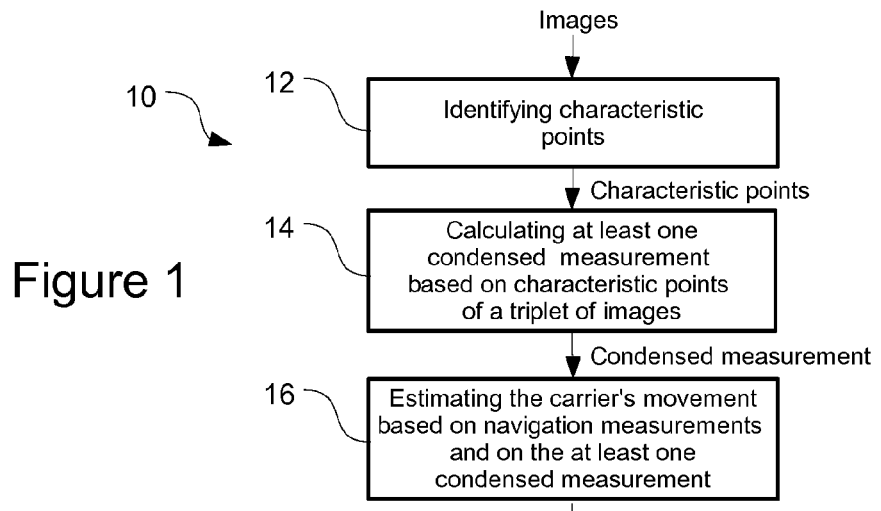
FIG. 1: a diagram showing the main steps of a method for estimating a carrier's movement according to the invention.

This invention relates to a method 10 for estimating a carrier's movement relative to an environment 20 with respect to which said carrier is moving.

In the context of the invention, the term "movement" is interpreted in the broad sense, i.e. any parameter relating to the carrier's trajectory in position and attitude relative to the environment 20 and/or allowing the trajectory to be predicted. Estimating the movement includes estimating at least one of the following parameters: position, attitude, velocity, acceleration. In the most common case, the goal sought is to estimate the whole movement, i.e. the position, attitude, linear velocity and angular velocity parameters of the carrier.

The carrier's movement is estimated for navigation purposes, i.e. for the purposes of estimating and predicting the carrier's trajectory relative to the environment 20. It is understood that the invention applies to any carrier whose movement one seeks to estimate for navigation purposes, such as a land, air or space vehicle, a robot, a missile, etc.

The invention is implemented by a navigation system using navigation measurements made by at least one navigation sensor installed in the carrier, and two-dimensional images produced by at least one vision sensor also installed in said carrier.

Each navigation sensor may be of any type, e.g. GPS receiver, accelerometer, odometer, gyroscope, etc. A preferred example of a combination of navigation sensors allowing the carrier's whole movement to be estimated comprises an inertial unit measuring the angular velocities and linear accelerations along the three axes of a reference frame associated to the carrier. Said inertial unit is preferably completed by a GPS receiver, and/or an altimeter, and/or an odometer, etc.

The navigation system comprises a computing device such as a programmed computer comprising at least one microprocessor and storage means (magnetic hard disk, flash memory, optical disk, etc.) on which is stored a computer program product, in the form of a set of program code instructions to be executed to implement the various steps of the method 10 for estimating the carrier's movement. According to some embodiments, the computing device also comprises one or more ASIC, FPGA, etc. types of integrated circuits, designed to implement all or part of the steps of the method 10.

The computing device is either installed in the carrier, or remote, i.e. located somewhere other than in the carrier, such as in a ground station in the case of a spacecraft type of carrier.

The carrier has at least one vision sensor installed, which can be of any type suitable for producing a two-dimensional (2D) image of the environment, such as an optical camera, an infrared camera, an imaging radar, etc. A vision sensor is adapted to produce images of the environment, e.g. in the form of an array of pixels providing physical information about the area of the environment placed in this vision sensor's field of view. The images are, for example, arrays of 1000×1000 pixels, at a frequency typically between 10 and 100 Hz.

It should be noted that a monocular vision system (in contrast, notably, to a stereoscopic system), comprising a single vision sensor, is sufficient to implement the invention. The rest of the description considers the non-limiting case in which the carrier has a single vision sensor, designed to provide 2D images of the environment, installed.

According to the invention, the carrier's movement is estimated by means of an estimate filter, called the "navigation filter", which takes as input the information determined from the measurements made by the navigation sensor or sensors and by the vision sensor, and combines said information in order to estimate the carrier's movement.

FIG. 1 shows, very schematically, a preferred mode of implementation of the estimation method 10, based on the identification of characteristic points of the environment. As shown in FIG. 1, the estimation method 10 comprises the following steps:

12 identifying characteristic points $M_i$ in images acquired by the vision sensor, representing characteristic points of the environment, 14 calculating, based on characteristic points of the images tracked from one image to the next within a triplet of images acquired at different times, at least one condensed measurement representative of characteristics of the carrier's movement during the acquisition of said triplet's images and 16 estimating the movement by the navigation filter, which takes as input navigation measurements made by the navigation sensor and the at least one condensed measurement.

Preferably, the steps of the estimate method 10 are iterated, i.e. condensed measurements are calculated for successive triplets of images, each of the condensed measurements calculated for these successive triplets being provided as input to the navigation filter.

Step 12 of Identifying Characteristic Points

The identification of characteristic points in an image is based on searching for characteristic areas of the image, which correspond to characteristic areas of the environment that are assumed to be fixed and visible in this image. For example, characteristic areas in an image are identified by determining sets of adjacent pixel that present good properties in terms of image correlation.

It is considered that there are N identified characteristic areas. The N characteristic areas can correspond to the total number of characteristic areas, or to a subset of all the characteristic areas identified. In the latter case, preferably the N characteristic areas are retained for which a geometric criterion (the characteristic areas are substantially uniformly distributed in the image, advantageously not too close to the edges of the image) and/or a correlation criterion (the N characteristic areas with the best correlation properties) is verified.

These N characteristic areas are tracked from one image to the next, for example by image correlation using the good correlation properties of the sets of pixel representing these characteristic areas. A point on the image, called the "characteristic point of the image" $M_i$, where i is between 1 and N, is associated with each characteristic area. The characteristic point $M_i$ of the image is, for example, the radiometric or geometric barycenter of the set of pixels representing this characteristic area, or a specific point of this set of pixels. Each characteristic point $M_i$ of an image represents a characteristic point $M'_i$ of the environment, assumed to be fixed relative to the environment.

Step 14 of Calculating at Least One Condensed Measurement

The method 10 uses at least one triplet of images of the environment, acquired at different times, to calculate at least one condensed measurement representative of characteristics of the carrier's movement between the acquisition times of the triplet's images.

It will be seen later in the description that this triplet of images is preferably selected from all the images acquired by the vision sensor.

A non-limiting example of calculating condensed measurements from characteristic points $M_i$ of the image in each image of the triplet of images will now be described.

It is understood that the conventions considered below, for the purposes of describing modes of implementation of the invention, do not limit the invention, which could be described equivalently by adopting other conventions without modifying the principle of the invention.

It is assumed, in a non-limiting way and for purposes of the description's clarity, that the acquisition times of the images are multiples of a constant time period $\Delta T$. Given an initial acquisition time $t_0$, it is understood that the image with index n is the image taken at time $t_n = t_o + n \cdot \Delta T$, which will be designated by "time n". In general it will be understood that, if the index n of a variable $W_n$ refers to the time, $W_n$ corresponds to the value of this variable W(t) at time $t = t_0 + n \cdot \Delta T$.

The rest of the description considers the case in which the current time is n. Amongst the images taken before time n, the triplet of images comprises three images $I_{n1}$, $I_{n2}$, $I_{n3}$ (n1<n2<n3), called "recalibration images".

As has been seen, the characteristic points $M_i$ are displaced from one image to the next when the carrier is in motion. The displacement of characteristic points $M_i$, $1 \leq i \leq N$, from one image to the next is representative of the carrier's translational and rotational movement. The displacement of characteristic points $M_i$ from one image to the next can be represented in the form of virtual tracks 30 illustrating the trajectories of these characteristic points in the vision sensor's focal plane 40.

Because of the carrier's translational and/or rotational displacement relative to the environment, the characteristic areas identified in a first image may not be visible in the subsequent images. It is therefore understood that some characteristic areas may "disappear" from one image to the next, whereas new characteristic areas may be identified.

Figure 2:
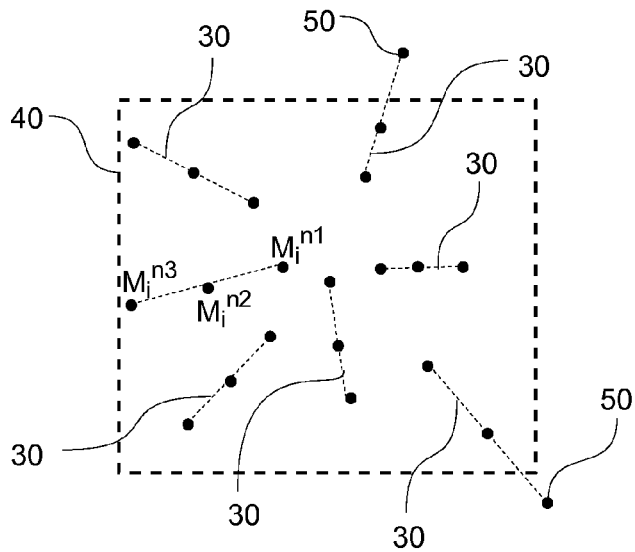
FIG. 2: a schematic representation, in the focal plane of an observation instrument, of virtual tracks formed by characteristic points tracked in several images acquired consecutively by said vision sensor.

FIG. 2 shows an example of such tracks 30 in the vision sensor's focal plane 40, between acquisition times n1 and n3.

The positions of characteristic point $M_i$ in each of images $I_{n1}$, $I_{n2}$ and $I_{n3}$ are designated by $M_i^{n1}$, $M_i^{n2}$ and $M_i^{n3}$. The virtual track 30 formed by the displacement of characteristic point $M_i$ is formed by the positions $M_i^{n1}$, $M_i^{n2}$ and $M_i^{n3}$ represented in the vision sensor's focal plane 40.

As seen above, because of the carrier's displacement some characteristic points $M_i$ will disappear from one image to the next. This phenomenon is illustrated by the presence of characteristic points outside the focal plane 40 in FIG. 2 (designated in this figure by reference 50). This representation of characteristic points of the image outside the focal plane 40 is virtual, since the characteristic points $M'_i$ outside the observation instrument's field of view do not appear in the image.

First, pairs of the triplet's recalibration images are considered and condensed measurements, at least one of which is used by the navigation system's navigation filter, are calculated from these pairs.

Hence an image pair from the triplet of recalibration images is considered, for example images $I_{n1}$, $I_{n2}$, and characteristic points $M_i$ representative of characteristic points $M'_i$ of the environment visible in both images of this pair are considered.

First, from positions $M_i^{n1}$ and $M_i^{n2}$ of points $M_i$ in recalibration image $I_{n1}$ and recalibration image $I_{n2}$ respectively, the relative pose between said two recalibration images $I_{n1}$ and $I_{n2}$ is formulated.

"Relative pose" means the variation in the position and attitude of the vision sensor (and therefore of the carrier, it being assumed that the vision sensor is fixed relative to the carrier or with an orientation known at all times with respect to said carrier) relative to the environment 20 between two times n1 and n2 of acquisition of the recalibration images $I_{n1}$ and $I_{n2}$.

Unless otherwise indicated, the rest of the description considers reference frame (O,X,Y,Z) associated with the vision sensor, for example defined by considering reference point O to be the center of the camera's focal plane, Z said vision sensor's optical axis, and (X,Y) the vision sensor's focal plane.

The vision sensor's relative pose is, for example, expressed in the reference frame associated with the vision sensor as it is oriented at time n2, designated by $R_{n2}$. There are different possible representations for the relative pose, and the case is considered in which said relative pose is expressed in the form $(P_{n1}P_{n2}, \delta\theta_{n1n2})$, in which:

$P_{ni}$ is the position of origin O of reference frame $R_{ni}$, ni equal to either n1 or n2, $P_{n1}P_{n2}$ is the vector formed by $P_{n1}$ and $P_{n2}$, with origin $P_{n1}$, $\delta\theta_{n1n2}$ is the transition matrix that transforms the coordinates of a vector in reference frame $R_{n1}$ into that vector's coordinates in reference frame $R_{n2}$.

Figure 3:
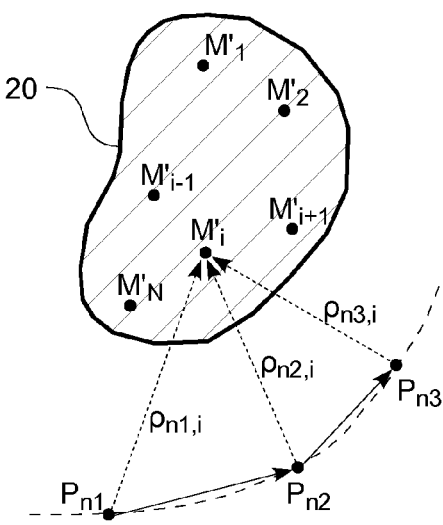
FIG. 3: a schematic representation of a carrier's displacement relative to an environment, illustrating some of the definitions used in the description.

FIG. 3 shows, very schematically, positions $P_{n1}$, $P_{n2}$ and $P_{n3}$ of origin O at times n1, n2 and n3, as well as the environment 20 relative to which the carrier moves and characteristic points $M'_i$ of this environment.

For each characteristic point $M'_i$ of the environment, there is the following vector relationship:

$$P_{n1}P_{n2} = P_{n1}M'_i - P_{n2}M'_i \tag{1}$$

Expression (1) can be expressed in an equivalent way in the following normalized form:

$$\frac{P_{n1}P_{n2}}{\|P_{n1}P_{n2}\|} = \frac{\|P_{n1}M'_i\|}{\|P_{n1}P_{n2}\|} \cdot \frac{P_{n1}M'_i}{\|P_{n1}M'_i\|} - \frac{\|P_{n2}M'_i\|}{\|P_{n1}P_{n2}\|} \cdot \frac{P_{n2}M'_i}{\|P_{n2}M'_i\|} \tag{2}$$

in which $\|AB\|$ designates the normal of vector AB, i.e. the distance between points A and B.

By designating as:
- $u_{n1n2}$ the unit vector (i.e. the vector with a norm equal to 1) colinear to vector $P_{n1}P_{n2}$,
- $u_{n1,i}$ the unit vector of the vision sensor's line of sight towards characteristic point $M'_i$ of the environment 20 at time n1,
- $u_{n2,i}$ the unit vector of the vision sensor's line of sight towards characteristic point $M'_i$ of the environment 20 at time n2,
- $\rho_{nj,i}$ the distance between characteristic point $M'_i$ and position $P_{nj}$ of the carrier at acquisition time nj (j equal to 1 or 2),
- $z_{nj,i}$ the ratio of distance $\rho_{nj,i}$ to distance $\|P_{n1}/P_{n2}\|$ traveled by reference point O between times n1 and n2, expression (2) can be expressed in the following equivalent form:

$$u_{n1n2} = z_{n1,i} \cdot u_{n1,i} - z_{n2,i} \tag{3}$$

Vector relationship (3) can be expressed in terms of coordinates in reference frame $R_{n2}$ at time n2 in the following form:

$$u_{n1n2}|R_{n2} = z_{n1,i} \cdot \delta\theta_{n1n2} \cdot u_{n1,i}|R_{n1} - z_{n2,i} \cdot u_{n2,i}|R_{n2} \tag{4}$$

in which:
- $u_{n1n2}|R_{n2}$ and $u_{n2,i}|R_{n2}$ designate the coordinates of unit vectors $u_{n1n2}$ and $u_{n2,i}$ respectively in reference frame $R_{n2}$,
- $u_{n1,i}|R_{n1}$ designates the coordinates of unit vector $u_{n1,i}$ in reference frame $R_{n1}$.

It is understood that each characteristic point $M'_i$ visible in both recalibration image $I_{n1}$ and recalibration image $I_{n2}$ can give rise to this type of vector relationship (4).

In expression (4), and for each characteristic point $M'_i$ of the environment 20, terms $u_{n1n2}|R_{n2}$, $\delta\theta_{n1n2}$, $Z_{n2,i}$ represent terms not known a priori, whereas terms $u_{n1,i}|R_{n1}$ and $u_{n2,i}|R_{n2}$, which are the lines of sight for these characteristic points in the vision sensor's reference frame, can be expressed directly from known positions $M_i^{n1}$ and $M_i^{n2}$ of characteristic points $M_i$ associated with characteristic points $M'_i$ of the environment in images $I_{n1}$ and $I_{n2}$ respectively.

In the rest of the description, "normalized relative pose" designates the set of parameters $(u_{n1n2}|R_{n2}, \delta\theta_{n1n2})$ (normalized in the sense that the unit vector $u_{n1n2}|R_{n2}$ corresponds solely to the direction of vector $P_{n1}P_{n2}$ with no indication of the distance between $P_{n1}$ and $P_{n2}$). A normalized relative pose therefore comprises five independent scalar parameters: two parameters describing the direction of unit vector $u_{n1n2}|R_{n2}$ and three parameters (normalized quaternion or Euler angles) giving the transition matrix $\delta\theta_{n1n2}$.

It is understood that, for each characteristic point $M'_i$ visible on recalibration images $I_{n1}$ and $I_{n2}$, there is a vector relationship (4) consisting of 3 scalar relationships. These 3 scalar relationships link positions $M_i^{n1}$ and $M_i^{n2}$, the 5 normalized relative pose parameters and the two distance ratios $z_{n1,i}$ and $z_{n2,i}$ also to be determined.

Because of normalization constraints $\|u_{n1n2}|R_{n2}\| = 1$, the previous 3 scalar relationships lead in effect to 2 independent scalar relationships.

In addition, distance ratios $z_{n1,i}$ and $z_{n2,i}$ are not independent; instead, they are linked together by the relationship $$z_{n2,i} = (z_{n1,i} \cdot \delta\theta_{n1n2} \cdot u_{n1,i}|R_{n1} - u_{n1n2}|R_{n2}) \cdot u_{n2,i}|R_{n2} \tag{5}$$

obtained by applying the scalar product by vector $u_{n2,i}|R_{n2}$ to both sides of equation (4). Consequently it is understood that, for each characteristic point $M'_i$, only one of the two distance ratios $z_{n1,i}$ and $z_{n2,i}$ is indeed an independent parameter.

The five normalized relative pose parameters are the same for all the characteristic points $M'_i$ visible on both recalibration images $I_{n1}$ and $I_{n2}$, whereas the distance ratios $z_{n1,i}$ and $z_{n2,i}$ linked together by relationship (5), depend on the characteristic point $M'_i$ in question.

By considering that there are $N_{12}$ characteristic points $M'_i$ visible on both images $I_{n1}$ and $I_{n2}$, there are therefore $2 \times N_{12}$ independent scalar relationships (the $N_{12}$ vector relationships (4)) for $(N_{12}+5)$ unknowns (five normalized relative pose parameters and $N_{12}$ independent distance ratios). It is therefore understood that the normalized relative pose and the distance ratios can be estimated as soon as $N_{12} = 5$ characteristic points $M'_i$ of the environment 20 are visible on both images $I_{n1}$ and $I_{n2}$.

It is advantageous to consider a number of characteristic points $M'_i$, greater or significantly greater than 5, in order to improve the accuracy of the condensed measurements estimation; this is always the case in practice since there can easily be several hundred characteristic points in a typical environment image of size 1000×1000 pixels. When the information extracted from the images and supplied to the navigation filter is limited to just condensed measurements, a larger number of characteristic points than in the prior art can advantageously be considered, without increasing the complexity of the calculations performed by said navigation filter. In the prior art, the number of states and measurements augmenting the navigation filter is directly proportional to the number N of characteristic areas kept, whereas this is not the case with the invention.

The estimation of the normalized relative pose between images $I_{n1}$ and $I_{n2}$ and distance ratios is performed by solving the system comprising the set of $2 \cdot N_{12}$ scalar relationships associated to $N_{12}$ characteristic points $M'_i$ of the environment. Solving this system can be performed by any method known to the man skilled in the art, preferably by utilizing a non-linear least-squares estimate technique. Indeed, this type of technique also allows the covariance matrix $C_{n1n2}$ of the estimation errors for these variables (normalized relative pose and distance ratios) to be estimated, and at the same time minimized.

Solving the system comprised of all the $2 \cdot N_{12}$ scalar relationships mentioned above allows a condensed measurement to be obtained from information contained in images $I_{n1}$ and $I_{n2}$, representative of the normalized relative pose between images $I_{n1}$ and $I_{n2}$, and also the covariance matrix of the estimation errors for this normalized relative pose, a matrix that is extracted from covariance matrix $C_{n1n2}$.

This condensed measurement may possibly be limited to estimating the carrier's direction of movement between images $I_{n1}$ and $I_{n2}$; this condensed measurement is therefore the estimate of vector $u_{n1n2}R_{n2}$, assuming that variations in attitude are estimated and/or measured without using images acquired by the vision sensor (for example, only using the navigation system).

During calculation step 14, preferably the same type of processing is performed for the pair of recalibration images $I_{n2}$ and $I_{n3}$ as that performed for the pair of recalibration images $I_{n1}$ and $I_{n2}$. This processing is performed using the following equations, established for each of the $N_{23}$ characteristic points $M'_i$ common to the two recalibration images $I_{n2}$ and $I_{n3}$:

$$u_{n2n3}|R_{n3} = w_{n2,i} \cdot \delta\theta_{n2n3} \cdot u_{n2,i}|R_{n2} - w_{n3,i} \cdot u_{n3,i}|R_{n3} \tag{6}$$

in which:
- $u_{n2n3}|R_{n3}$ and $u_{n3,i}|R_{n3}$ respectively designate the coordinates of unit vectors $u_{n2n3}$ (colinear to vector $P_{n2}P_{n3}$) and $u_{n3,i}$ (colinear to vector $P_{n3}M'_i$) in reference frame $R_{n3}$, $u_{n2,i}|R_{n2}$ designates the coordinates of unit vector $u_{n2,i}$ (colinear to vector $P_{n2}M'_i$) in reference frame $R_{n2}$, $\rho_{nj,i}$ the distance between characteristic point $M'_i$ and position $P_{nj}$ of the carrier at acquisition time nj (j equal to 2 or 3), $w_{nj,i}$ is the ratio of distance $\rho_{nj,i}$ to distance $\|P_{n2}P_{n3}\|$ traveled by reference point O between times n2 and n3, n2-n3, $\delta\theta_{n2n3}$ is the transition matrix that transforms the coordinates of a vector in reference frame $R_{n2}$ into that vector's coordinates in reference frame $R_{n3}$.

In the same way as for the pair of recalibration images ($I_{n1}$, $I_{n2}$), based on positions $M_i^{n2}$ and $M_i^{n3}$ of points $M_i$ respectively in images $I_{n2}$ and $I_{n3}$, the five normalized relative pose parameters between times n2 and n3 are estimated, as well as the two distance ratios $w_{n2,i}$ and $w_{n3,i}$.

This estimation of the normalized relative pose and distance ratios between times n2 and n3 is performed by any method known to the expert, preferably by utilizing a non-linear least-squares estimate technique using equations (6). Preferably, the covariance matrix $C_{n2n3}$ of the estimation errors for these variables is also estimated.

This estimation allows a condensed measurement to be obtained from information contained in images $I_{n2}$ and $I_{n3}$, representative of the normalized relative pose between images $I_{n2}$ and $I_{n3}$, and also the covariance matrix of the estimation errors for this normalized relative pose, matrix that is extracted from covariance matrix $C_{n2n3}$.

It should be noted that, according to some implementation examples, nothing precludes this condensed measurement from being limited to estimating the carrier's direction of movement between images $I_{n2}$ and $I_{n3}$; this condensed measurement is therefore the estimate of vector $u_{n2n3}|R_{n3}$.

It may be noted that, in addition to the condensed measurements obtained by estimating normalized relative poses between image pairs ($I_{n1}$,$I_{n2}$) and ($I_{n2}$,$I_{n3}$) of the triplet of images in question, condensed measurements may also be formed using the estimate of the normalized relative pose between image pairs ($I_{n1}$,$I_{n3}$). However, the condensed measurement thus formed does not provide additional information compared to the preceding ones.

During calculation step 14, a set of characteristic points $M'_i$ visible in the three recalibration images $I_{n1}$, $I_{n2}$, $I_{n3}$ of the triplet is determined. The number of characteristic points $M'_i$ in question, visible in the triplet's three recalibration images, is designated by $N_{123}$.

The following relationship is satisfied for these characteristic points $M'_i$, by the definition of parameters $\rho_{n2,i}$:

$$\rho_{n2,i} = w_{n2,i} \|P_{n2}P_{n3}\| = z_{n2,i} \|P_{n1}P_{n2}\| \quad (7)$$

The estimate of distance ratios $w_{n2,i}$ and $z_{n2,i}$, as described above, thus allows another type of condensed measurement to be determined using equation (7), associated to image triplet ($I_{n1}$,$I_{n2}$,$I_{n3}$) and representative of the ratio of the distances traveled $\delta = \|P_{n2}P_{n3}\|/\|P_{n1}P_{n2}\|$. This condensed measurement representative of the ratio of distances traveled is, for example, an estimate of the value of ratio $\delta$, or an estimate of the value of function of this ratio, such as $\arctan(\delta)$.

It should be noted this condensed measurement, representative of the ratio of distances traveled, can be calculated at the same time as the other condensed measurements described above, by utilizing a non-linear least-squares estimate technique for these measurements using equations (4), (6), (7), such that the covariance matrix of the estimation errors associated to the set of condensed measurements that will be used by the navigation filter can be estimated simultaneously.

It is therefore understood that different condensed measures can be calculated during calculation step 14, in particular a measurement representative of the ratio of distances traveled, measurements representative of the normalized relative poses (possibly limited to condensed measurements representative of the carrier's direction of movement). The amount of information from the images to be processed by the navigation filter is advantageously limited to condensed measurements, and as a result is very small compared to the prior art. In effect, the condensed measurement representative of the ratio of distances traveled consists essentially of a scalar parameter, and each condensed measurement representative of a normalized relative pose consists essentially of five scalar parameters.

Step 16 of Estimating the Carrier's Movement

During estimation step 16, the carrier's movement is estimated using the navigation filter; this navigation filter as input navigation measurements made by the navigation sensor or sensors and at least one condensed measurement. In other words, the navigation filter performs a merger between, firstly, navigation measurements and, secondly, at least one condensed measurement determined from a triplet of images acquired by the vision sensor.

The carrier's movement is preferably estimated at least as a function of the condensed measurement representative of the ratio of distances traveled corresponding to the triplet of images ($I_{n1}$, $I_{n2}$, $I_{n3}$). Using both the condensed measurement representative of the ratio of distances traveled and condensed measurements representative of normalized relative poses corresponds to a preferred embodiment of estimation method 10.

The estimate of the carrier's movement utilizes a navigation filter; there are numerous possible navigation filter implementations for this, such as a Kalman filter, an extended Kalman filter, an information filter, a particle filter, a Bayesian filter, etc. Such navigation filters are considered to be known to the man skilled in the art and one could refer, inter alia, to the scientific publications referred to above.

Very generally, these filters propagate over time an estimate of the carrier's state and the covariance matrix of the estimation error for this state using a temporal evolution model for the state and they recalibrate this estimate and the associated covariance matrix based on measurements and the covariance of measurement errors which are supplied to them, in the scenario in which these measurements are dependent on the carrier's state.

The navigation filter's state vector comprises in particular the carrier's state at time n (i.e. the movement whose estimate is sought), which is designated by $X_n$. Preferably, state $X_n$ comprises at least 6 parameters: 3 parameters representative of the position of a reference frame associated to the carrier in a reference frame external to the carrier, which can be any reference point linked deterministically to the environment, and 3 parameters representative of the attitude of said reference frame associated to the carrier in said reference frame external to the carrier.

Preferably, the navigation filter's state vector is augmented, compared to the prior art, to include the carrier's state at times n1, n2 and n3, designated by $X_{n1}$, $X_{n2}$ and $X_{n3}$ respectively. For example, states $X_{n1}$, $X_{n2}$, $X_{n3}$ contain the six position and attitude parameters for the carrier's reference frame at times n1, n2, n3 respectively.

According to the invention, the measurements provided to the navigation filter for recalibrating (or updating) the estimates of the carrier's states include navigation measurements made by the navigation sensor or sensors and at least one condensed measurement. In a preferred mode of implementation, the condensed measurements provided to the navigation filter include, from time n2, the estimate of the normalized relative pose (or the estimate of the direction of movement) between times n1 and n2 and, from time n3, firstly the estimate of the normalized relative pose (or the estimate of the direction of movement) between times n2 and n3 and, secondly, the measurement of the ratio of distances traveled between times n1 and n2, and between times n2 and n3, respectively.

It is noted that, by definition, the measurements of the normalized relative pose and the ratio of distances traveled are expressed simply and analytically as a function of the position and attitude parameters included in states $X_{n1}$, $X_{n2}$, $X_{n3}$ of the augmented state vector. This relationship between condensed measurements and states $X_{n1}$, $X_{n2}$, $X_{n3}$ is a measurement model used in a conventional manner by the augmented navigation filter (e.g. Kalman filter).

Preferably, when the covariances of errors in the estimate for some or all of the condensed measurements (estimate of the ratio of distances traveled, estimates of the normalized relative pose or estimates of the direction of movement) have been determined beforehand, they are also provided to the navigation filter, in addition to the navigation measurements and condensed measurements, to be processed in a conventional manner by the navigation filter (e.g. Kalman filter).

Mixing navigation measurements with the condensed measurement yields, in some applications, significant improvements in the accuracy of the estimate of the carrier's movement.

For example, the case is considered in which the carrier's displacement is rectilinear, with a substantially constant acceleration $a_1$ between times n1 and n2, and a substantially constant acceleration $a_2$ between times n2 and n3 (acceleration $a_2$ can be equal to acceleration $a_1$, but accelerations $a_1$ and $a_2$ are not both zero). This case is representative, although very simplified, of a scenario of the carrier's landing on a terrain, a scenario in which accelerations $a_1$ and $a_2$ are negative.

Simple kinematic calculations allow the following relationships to be established:

$$\|P_{n1}P_{n2}\|=v_1 \cdot \Delta t_{12}+\tfrac{1}{2}\cdot a_1 \cdot (\Delta t_{12})^2 \quad (8a)$$

$$\|P_{n2}P_{n3}\|=(v_1+a1\cdot \Delta t_{12})\cdot \Delta t_{23}+\tfrac{1}{2}\cdot a_2\cdot (\Delta t_{23})^2 \quad (8b)$$

in which $\Delta t_{12}=t_{n2}-t_{n1}$ and $\Delta t_{23}=t_{n3}-t_{n2}$, and $v_1$ is the carrier's speed relative to the environment at time n1.

From relationships (8a) and (8b) it is deduced that:

$$v_1 = \frac{1/2\cdot \delta \cdot a_1 \cdot (\Delta t_{12})^2 - a_1 \cdot \Delta t_{12}\cdot \Delta t_{23} - 1/2\cdot a_2 \cdot (\Delta t_{23})^2}{\Delta t_{23} - \delta \cdot \Delta t_{12}} \quad (9)$$

The fact that the movement is accelerated means that the ratio $\delta$ of the distances traveled respectively between times n2 and n3, and times n1 and n2, is different from the ratio $\Delta t_{23}/\Delta t_{12}$ (the carrier is not traveling at a constant speed, on average between times n1 and n3). Therefore, the denominator of expression (9) is not zero and it is seen that knowledge of the condensed measurement representative of the ratio $\delta$ of distances traveled, coupled with knowledge of the acceleration, allows the carrier's speed $v_1$ to be estimated.

Taking images into account in the navigation system offers the advantage that knowledge of the speed $v_1$ is not obtained by integrating the acceleration, whose measurement is imbued with errors; this avoids drift and therefore allows improved accuracy in estimating the carrier's state $X_n$, and thus its movement relative to the environment 20.

Taking condensed measurements into account is also advantageous when the navigation system provides intermittent assistance (e.g. a GPS satellite positioning system or other in an urban canyon, or an odometer in a slippery environment).

As an example, it is assumed that the navigation system is operational between time n1 and n2, but is no longer operational between times n2 and n3. The navigation system provides a fairly accurate estimate of the displacement $P_{n1}P_{n2}$, and therefore of the distance $\|P_{n1}/P_{n2}\|$ traveled by the carrier between times n1 and n2, but it no longer provides a reliable estimate between times n2 and n3. The condensed measurement representative of the ratio of distances traveled at time n3 allows the distance traveled $\|P_{n2}P_{n3}\|$ between times n2 and n3 to be estimated, as a function of the estimate of the distance traveled $\|P_{n1}P_{2n}\|$ provided by the navigation system. The estimate of the distance traveled $\|P_{n2}P_{n3}\|$, combined with the condensed measurement representative of the normalized relative pose between times n2 and n3, allows displacement $P_{n2}P_{n3}$ to be estimated. It is therefore understood that the vision system can substitute for the inadequacies of the navigation system between time n2 and n3. Step by step, the estimate of the movements made, and thus of the carrier's state in position and attitude, can be propagated in this way until the navigation system is again operational.

Method 10 is applied sequentially to times after n3 according to the same principles. For example, at time n4 after n3, the method is applied to recalibration images $I_{n2}$, $I_{n3}$, $I_{n4}$, replacing state $X_{n1}$ in the navigation filter's state vector by state $X_{n4}$ of the carrier at time n4. It is noted that between times n3 and n4, the visual information processed by the augmented navigation filter is advantageously limited to the condensed measurements determined from recalibration images $I_{n1}$, $I_{n2}$ and $I_{n3}$.

Selecting the Triplet of Recalibration Images

In an implementation variant of estimation method 10, compatible with any of the modes of implementation described above, the triplet's recalibration images are images selected from a plurality of images acquired by the vision sensor. In other words, acquisition times $t_{n1}$, $t_{n2}$ and $t_{n3}$ are not necessarily spaced in time by time period $\Delta T$. This selection of recalibration images results in compressing the acquired images so as to keep only a sub-set for estimating the carrier's movement.

Preferably, at least one of the triplet's recalibration images is an image for which a carrier's displacement detection criterion has been verified. According to an example, the carrier's displacement detection criterion is verified when, with a first recalibration image selected and with an integer N of characteristic points $M'_i$ identified in said first recalibration image, a second recalibration image is selected as a subsequent image to the first recalibration image in which at least Nb of the N characteristic points $M'_i$ of the first image are no longer visible, where Nb is substantially equal to a predefined percentage $r_P$ of N, i.e. substantially equal to $r_P \cdot N$.

The predefined percentage $r_P$ of characteristic points $M'_i$ that are no longer visible in the second recalibration image is preferably equal to or greater than 20%, for example equal to 25%.

In this way, having identified N characteristic points $M'_i$ visible in recalibration image $I_{n1}$ (typically N is of the order of 300), these are tracked in the subsequent images acquired by the observation instrument until at least Nb characteristic points, where Nb is substantially equal to $r_P \cdot N$, are no longer visible in a subsequent image. This subsequent image is then considered to be the second recalibration image $I_{n2}$ of the triplet. Similarly, the third recalibration image $I_{n3}$ of the triplet is selected as a subsequent image to recalibration image $I_{n2}$, in which at least Nb characteristic points, where Nb is substantially equal to $r_P \cdot N$, are no longer visible in this subsequent image whereas they were visible in the second recalibration image $I_{n2}$.

The advantage of such a choice of times n2 and n3 relative to time n1 is the fact that it summarizes in a global way an entire set of constraints to be met in order to solve the given problem, such as the fact of waiting for the carrier to have moved sufficiently relative to the environment 20 to make this displacement observable from the recalibration images. Conversely, it also ensures that the carrier has not moved too far, so as to retain a sufficiently large number of characteristic points $M'_i$ common to the recalibration images selected.

Thus, this choice of times n1, n2, n3 is advantageous in that it makes it possible to adapt automatically to the camera's field of view and to the dynamics of the carrier relative to the environment, and more specifically to the impact of this dynamic on the vision system. For example, if the image of the environment changes slowly because the carrier is very far from the characteristic points $M'_i$, or because it is close to them but moving at a low speed, times n1, n2, n3 can be separated by intervals of several tens of seconds to several minutes, for example. In contrast, if the carrier is near the characteristic points $M'_i$ with a high speed, the intervals between n1, n2, n3 will be small, e.g. from several tenths of a second to several seconds.

It should be noted that a criterion based on the disappearance of a predefined percentage $r_P$ of the N identified characteristic points $M'_i$ is especially suitable for the case in which the carrier is moving towards the environment 20. As an alternative or as a complement, a criterion based on the appearance of at least a number Nb of characteristic points $M'_i$ from one image to the next, where Nb is substantially equal to $r_P \cdot N$, is considered. Such a criterion is especially suitable for the case in which the carrier is moving away from the environment 20.

The carrier's displacement detection criteria based on the appearance or disappearance of characteristic points are especially suitable for carriers subjected to constant acceleration, such as landing gear. Times n2 and n3 can also be selected according to a profile of the carrier's acceleration, when this is known beforehand, in particular to optimize the observability of the speed.

However, it will be understood that the selection of the triplet's recalibration images, in particular times n2 and n3 with respect to time n1, can be made according to any other carrier's displacement detection criterion, such as an analytical criterion taking into account the various parameters involved (the observation instrument's field of view, the carrier's estimated distance with respect to the characteristic points $M'_i$ of the environment 20, the carrier's estimated speed, the carrier's estimated acceleration, etc.), or for the purpose of optimizing the observability of the evolution in the carrier's movement.

Once a first triplet of recalibration images has been selected, the following triplets can be chosen independently of the first triplet of images, or using the first triplet of recalibration images.

According to a first example, triplets corresponding to sliding windows of recalibration images are considered. For example, first of all a triplet comprising images $I_{n1}, I_{n2}, I_{n3}$ is considered, then a triplet comprising images $I_{n2}, I_{n3}, I_{n4}$ is considered, then a triplet comprising images $I_{n3}, I_{n4}, I_{n5}$ is considered, etc.

According to another example, triplet $I_{n1}, I_{n3}, I_{n5}$, and possibly another triplet obtained from images $I_{n1}, I_{n2}, I_{n3}, I_{n4}, I_{n5}$, are also processed.

Eliminating Aberrant Characteristic Points

Figure 4A:
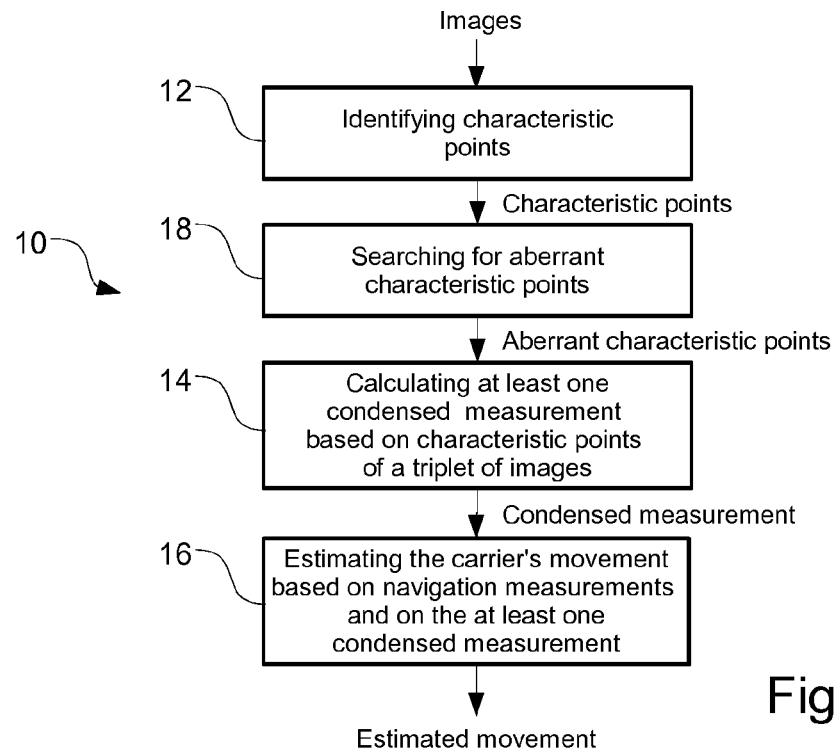
FIG. 4a: a diagram showing the main steps of a particular mode of implementation of a method for estimating a carrier's movement according to the invention.

In a preferred variant implementation, shown in FIG. 4a, method 10 comprises a step 18 of searching for aberrant characteristic points amongst the images' plurality of characteristic points; characteristic points regarded as aberrant are not considered in calculation step 14.

In effect, one advantage of selecting the triplet's recalibration images from a plurality of images lies in the fact that the interval between the pictures being taken will generally be higher than in the prior art (in which the images obtained at the image acquisition frequency, i.e. ΔT, are considered). Thus, the changes over time in the properties of the characteristic points identified in the images can be monitored, and those whose evolution appears inconsistent with the assumption that these characteristic points represent stationary points in the environment can be removed.

Any method of removing aberrant data, such as the "Random Sample Consensus" method (commonly called RANSAC) can be used to eliminate aberrant characteristic points. Such a method is described in the article by Martin A. Fischler and Robert C. Bolles "Random Sample Consensus: A Paradigm for Model Fitting with Applications to Image Analysis and Automated Cartography", in *Comm. Of the ACM*, vol. Jun. 24, 1981, p. 381-395.

Figure 4B:
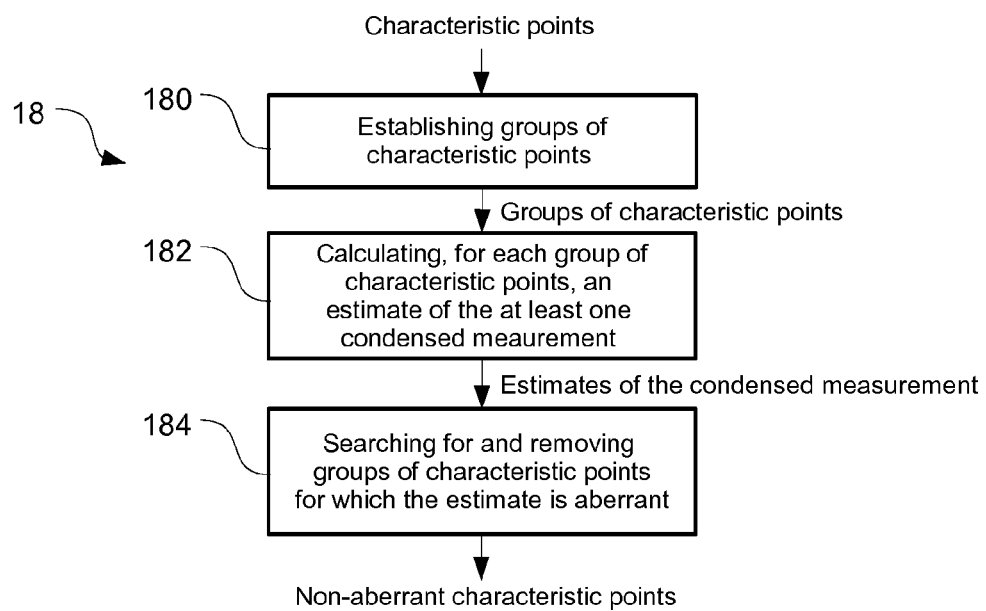

FIG. 4b shows a preferred mode of implementation for step 18 of searching for aberrant characteristic points. The description of FIG. 4a considers the non-limiting case in which aberrant characteristic points are sought with regard to calculating a condensed measurement representative of the ratio of distances traveled, i.e. the case requiring characteristic points of the environment visible on each of the triplet's three recalibration images to be identified.

As shown in FIG. 4b, step 18 comprises a sub-step 180 during which groups of characteristic points of the triplet of images, representing five characteristic points of the environment visible in each of the triplet's images, are established.

Step 18 then comprises a sub-step 182 during which an estimate of the condensed measurement representative of the ratio of distances traveled is calculated for each group of characteristic points of the images.

Step 18 then comprises a sub-step 184 during which groups are sought for which the estimate of the condensed measurement representative of the ratio of distances traveled is aberrant relative to the set of estimates. The characteristic points of such groups, for which the estimate of the condensed measurement representative of the ratio of distances traveled is considered aberrant, are not used during calculation step 14.

In effect, as seen previously, a condensed measurement representative of the ratio of distances traveled (respectively a condensed measurement representative of a normalized relative pose) can be obtained from the characteristic points of the triplet of recalibration images (respectively of a pair of recalibration images) representing five characteristic points of the environment. The same condensed measurement can therefore be estimated several times by considering different groups of characteristic points representing five characteristic points of the environment amongst all the characteristic points identified and, using a RANSAC-like method, those estimates that, since they result from a group representing five characteristic points of the environment amongst which there is at least one aberrant characteristic point, would be very distant from a large number of estimates close to each other and deemed to be consistent can be removed. The groups of aberrant characteristic points can also be eliminated by calculating a mean value μ and a standard deviation a for the estimates, and not retaining the characteristic points of groups for which the estimate obtained is very distant from the mean value μ, e.g. a distance of more than k·σ, where k is for example equal to 2 or 3.

It should be noted that, according to certain implementation examples, nothing precludes groups of characteristic points of images representing more than 5 points characteristics of the environment from being considered.

Generalizing Method 10 to Characteristic Elements

The implementation examples of method 10 described above are based on using characteristic points appearing in the images. The associated processing is simple and efficient in computation time. However, other image processing techniques can be used to calculate the condensed measurements.

More generally, estimation method 10 uses characteristic elements of images, considered as representing characteristic elements of the environment. In particular, according to other examples, method 10 uses characteristic objects or one or more characteristic surfaces, which are discussed below.

a) Characteristic Objects

In the simplest case, characteristic objects relating to the environment are, for example, line segments (very frequent case when the carrier moves relative to a structured environment, for example comprising buildings). Tracking such characteristic objects from one image to the next is performed for example as described in the scientific publication of authors Peer Neubert, Peter Protzel, Teresa Vidal-Calleja and Simon Lacroix, "A Fast Visual Line Segment Tracker" in IEEE Int. Conf. on Emerging Technologies and Factory Automation, Hamburg (Germany), September 2008.

These objects can be identified, matched and tracked from one image to another. The differences in the position and orientation of these objects from one image to the next gives information about the change in the carrier's position and attitude relative to the environment, since they are linked together by geometric relationships. In general, a small number of such objects is sufficient to estimate the normalized relative poses from one image to the next without ambiguity, and the ratios of distance traveled in a triplet of images, as described above in the case of characteristic points.

For example, a line segment in the image can be described by two parameters: the distance from the center of the focal plane and the angle of orientation in the focal plane. This line segment in the image represents a characteristic segment of the environment that may itself be parameterized in three dimensions. The line segment's variation from one image to the next provides two parameters that are the variations of this distance and of this angle. The variation in these parameters is geometrically dependent on the position and orientation of the environment's line segment in the reference frame associated to the carrier and on the carrier's movement from one image to the next. These geometric relationships can be used to estimate the condensed measurements in the same way that the positions of the characteristic points $M_i$ in the image were used to estimate these condensed measurements. Advantageously, a combination of characteristic points and objects can be used, for example by considering the extremities of a line segment type of characteristic object.

b) Characteristic Surfaces

In another variant of the method, in particular when the carrier moves in environments that are not very structured (e.g. terrain overflights) it can be assumed that the near-by pixels in the image represent near-by points in the environment and that the environment, or a part of this environment (which will be called the "terrain" in this case), can be described by a continuous surface, known as the characteristic surface of the environment. The objective can be to identify, in its entirety, the part of the terrain surface visible in two or three images (without the use of characteristic objects or points) at the same time as the condensed measurements are estimated. For example, the terrain surface is described in the form of parameterized 3D grids (typically several hundred parameters). By using a first pair of images $(I_{n1}, I_{n2})$ (it is assumed that there has been a shift in position between the two images), the surface's parameters and the condensed measurement of the normalized relative pose are estimated at the same time using the largest possible number of pixels (those representing the points of the environment visible in both images), irrespective of characteristic objects or points. This can be done, for example, by using stereoscopic processing techniques, such as those given in the article by S. M. Seitz, B. Curless, J. Diebel, D. Scharstein, and R. Szeliski, "A Comparison and Evaluation of Multi-View Stereo Reconstruction Algorithms" in Proc. CVPR 2006. The relief is thus estimated "by stereoscopic effect" from the pair of images $(I_{n1}, I_{n2})$. This estimate is made with a scale factor, given by the distance traveled between n1 and n2 (equivalent to the base of a pair of stereoscopic images). Suppose that this distance is known, which removes the ambiguity about the terrain surface. This surface having now been estimated, the changes in the image of this surface at a time n3 after n2 can be predicted, according to the absolute pose between times n2 and n3 (possibly a model of the terrain's illumination and reflectance can be used). By correlating the predicted image at n3 with the actual image $I_{n3}$, not only can the normalized relative pose between times n2 and n3 be estimated, as previously, but also the distance traveled between n2 and n3 can be estimated, as the distance that maximizes the correlation between the image predicted for this distance and the actual image. If only the information contained in the image is used, the distance traveled between n1 and n2 is not observable, nor is the distance traveled between n2 and n3, but the ratio of distances traveled respectively between (n1, n2) and (n2, n3) will be.

Advantages of Method 10 Compared to the Prior Art

The number of scalar parameters added to the navigation filter's state vector is advantageously fixed and equal to 18 (based on memorizing states $X_{n1}$, $X_{n2}$ and $X_{n3}$, each comprising 6 scalar parameters) instead of several hundred additional parameters with the state of the art techniques.

In addition, the number of additional measurements is significantly reduced and optimized, advantageously limited to condensed measurements instead of all the positions of the characteristic points of the image in the prior art. Thus, only a few parameters (condensed measurement representative of the ratio of distances traveled, condensed measurement representative of the direction of movement or the normalized relative pose) are added to the navigation measurements instead of several hundred (the position of characteristic points in the image) in the prior art.

In addition, in the case where the characteristic elements are characteristic points, the complexity associated with calculation step 14 is linear with the number $N_{123}$ of characteristic points $M'_i$ considered, visible in the triplet's three recalibration images. The complexity introduced by the calculation step 14 is lower, even significantly lower, than the complexity associated with the processing, by the navigation filter, of all the positions of the characteristic points $M_i$ in each of the images.

Moreover, the processing of intermediate images (between times n1 and n2, n2 and n3, etc.) can only be reduced on tracking characteristic elements by image correlation. Consequently, the method's efficiency in terms of volume of calculations to be performed can be understood. There are very significant advantages in terms of processing: reduction in the number of images processed, image processing proportional to the number of points, possibility of performing calculations in parallel, etc.

Calculation step 14, which allows the condensed measurement to be calculated, permits all the characteristic points identified to be taken into account without having to select a small number of them. In the prior art, it was common to keep only 10% of the characteristic points because of computational complexity reasons. This is no longer the case here, since calculation step 14 allows the information derived from all the characteristic points to be summarized in a limited number of parameters.

Non-Limiting Application Examples of the Invention

The use of the invention is advantageous in many cases, such as:
- carriers undergoing high accelerations (landing gear, missiles): as the carrier is accelerating, the condensed measurements contain information on the speed and acceleration relative to the environment; the acceleration being known from prior knowledge of the command or via a measurement of the acceleration, the relative speed can be deduced from this;
- carriers on the ground: if the movement between the first two images $I_{n1}$ and $I_{n2}$ is known, using external odometry or satellite navigation (GPS, even limited to a number of satellites less than 4) for example, the condensed measurements allow this knowledge to be propagated to image $I_{n3}$; the condensed measurements can be used as a complement to or instead of odometry or as a complement to it in the case of skidding, or even as a complement to satellite navigation in case of temporary unavailability (urban canyons, etc.).
- rendezvous of two space vehicles: before rendezvous operations begin, the vehicles are generally waiting and almost fixed relative to other; it is important to acquire at least two images during this phase, so that the acquisition of another image shortly after the chase vehicle begins to accelerate enables observability of the relative distance between the vehicles by using the condensed measurements;
- retroactive location of carriers: the proposed processing can be performed on data recorded in flight and then stored and processed on the ground after the flight.

The invention claimed is:

1. Method (10) for estimating a carrier's movement relative to an environment (20) with respect to which said carrier is moving, the carrier having at least one navigation sensor and at least one vision sensor producing 2D images of the environment installed, wherein said method comprises the following steps:
   (12) identifying, in images acquired by the vision sensor, characteristic elements of the images representing characteristic elements of the environment,
   (14) calculating at least one condensed measurement, based on characteristic elements of a triplet of images acquired at different times, the at least one condensed measurement being representative of characteristics of the carrier's movement during the acquisition of said triplet's images,
   (16) estimating the movement by an estimate filter, called the "navigation filter", based on navigation measurements made by the navigation sensor and on the at least one condensed measurement.

2. The method (10) according to claim 1, wherein, during the calculation step (14), a condensed measurement is determined that is representative of a ratio of the distances traveled by the carrier between the acquisition times of two image pairs of said triplet, based on characteristic elements of the triplet's images representing characteristic elements of the environment visible on each of said triplet's three images.

3. The method (10) according to claim 1, wherein, during the calculation step (14), at least one condensed measurement is determined that is representative of a direction of the carrier's displacement between the acquisition times of an image pair of the triplet, based on characteristic elements of this image pair representing characteristic elements of the environment visible on each of this pair's two images.

4. The method (10) according to one claim 1, wherein, during the calculation step (14), at least one condensed measurement is determined that is representative of a normalized relative pose between the acquisition times of an image pair of the triplet, based on characteristic elements of this image pair representing characteristic elements of the environment visible on each of this pair's two images.

5. The method (10) according to claim 1, wherein the characteristic elements are characteristic points and/or characteristic objects or one or more characteristic surfaces.

6. The method (10) according to claim 1, wherein the triplet's images are images selected from a plurality of images acquired by the vision sensor.

7. The method (10) according to claim 6, wherein at least one of the triplet's images is an image for which a carrier's displacement detection criterion is verified.

8. The method (10) according to claim 7, wherein the carrier's displacement detection criterion is verified for a second image when, with a first image selected and with a plurality of characteristic elements of the environment, N in number, visible in said first image:
   at least Nb of the N characteristic elements of the environment have disappeared in said second image, or
   at least Nb new characteristic elements of the environment have appeared in said second image,
Nb being substantially equal to $r_p \cdot N$, where $r_p$ is a predefined percentage.

9. The method (10) according to claim 8, wherein the predefined percentage $r_p$ is equal to or greater than 20%, preferably substantially equal to 25%.

10. The method (10) according to claim 1, comprising a step (18) of searching for aberrant characteristic elements amongst the plurality of characteristic elements of the images, characteristic elements regarded as aberrant not being considered in the calculation step (14).

11. The method (10) according to claim 10, wherein the step (18) searching for aberrant characteristic elements of the images comprises the following sub-steps:
   (180) establishing groups of characteristic elements representative of at least five characteristic elements of the environment visible in each image of a pair and/or triplet to be used to calculate a condensed measurement,
   (182) calculating, for each group of characteristic elements of the images, an estimate of the condensed measurement to be calculated,
   (184) searching for groups of aberrant characteristic elements for which the estimate of said condensed measurement to be calculated is aberrant with respect to all the estimates of said condensed measurement to be calculated.

12. The method (10) according to claim 1, wherein the navigation filter's state vector comprises the carrier's state at the acquisition times of the triplet's images.

13. The method (10) according to claim 12, wherein a condensed measurement representative of a normalized relative pose between the acquisition times of at least one pair of the triplet is supplied to the navigation filter substantially at the time the second image of said pair is acquired.

14. The method (10) according to claim 1, wherein, during the calculation step (14), the error in estimating the at least one condensed measurement is estimated and in that, in the estimation step (16), the carrier's movement is estimated based on the estimate of the error made in estimating the at least one condensed measure.

15. Computing device for a navigation system of a carrier having at least one navigation sensor and at least one vision sensor installed, wherein said computing device comprises means configured to estimate the carrier's movement according to claim 1.

\* \* \* \* \*